United States Patent
Cantacuzene

(10) Patent No.: US 6,315,977 B1
(45) Date of Patent: Nov. 13, 2001

(54) PROCESS AND APPARATUS FOR PRODUCING HYDROGEN BY THERMOCATALYTIC DECOMPOSITION OF HYDROCARBONS

(75) Inventor: Serban Cantacuzene, Massy (FR)

(73) Assignee: L'Air Liquide, Societe Anonyme pour l'Etude et l'Exploitation des Procedes Georges Claude, Paris (FR)

(*) Notice: Subject to any disclaimer, the term of this patent is extended or adjusted under 35 U.S.C. 154(b) by 0 days.

(21) Appl. No.: 09/499,737

(22) Filed: Feb. 8, 2000

(30) Foreign Application Priority Data

Mar. 10, 1999 (FR) .................................................. 99 02948

(51) Int. Cl.$^7$ ..................................................... C01B 3/26
(52) U.S. Cl. ........................... 423/651; 208/74; 208/121; 422/190; 422/193; 422/211; 423/445 R; 423/447.3
(58) Field of Search ............................ 423/445 R, 447.3, 423/651; 208/74, 121; 422/190, 193, 211

(56) References Cited

U.S. PATENT DOCUMENTS 4,088,450 * 5/1978 Kosaka et al. ....................... 423/652

FOREIGN PATENT DOCUMENTS

| 31 22 273 | 12/1982 | (DE) | ................. | C01B/3/26 |
| 61 161133 | 7/1986 | (JP) | ................. | B01J/8/06 |

OTHER PUBLICATIONS

Poirier, M. G., et al.: "Catalytic Decomposition of Natural Gas to Hydrogen for Fuel Cell Applications", International Journal of Hydrogen Energy, GB, Elsevier Science Publishers, B.V., Barking, vol. 22, No. 4, 1997, pp. 429–433.

* cited by examiner

Primary Examiner—Steven P. Griffin
Assistant Examiner—Maribel Medina Sanabria
(74) Attorney, Agent, or Firm—Burns, Doane, Swecker & Mathis, L.L.P.

(57) ABSTRACT

A process for producing a production gas mixture comprising hydrogen, by thermocatalytic decomposition of an initial mixture which comprises at least one hydrocarbon, comprising the steps of:

1. feeding the initial mixture to a system comprising, in succession, at least a first reaction zone $R_1$ and a second reaction zone $R_2$, each of the reaction zones including a catalyst, comprising a concentration of a metal, which is capable on contact with the hydrocarbon of forming carbon nanotubes, wherein the zones $R_1$ and $R_2$:
   - are separate within at least two different consecutive reactors or consecutive within the same reactor, and
   - are subjected to at least one of an increasing temperature gradient and an increasing metal concentration gradient in the catalyst;
2. reacting the initial mixture in the first catalytic reaction zone $R_1$ to form a first intermediate mixture comprising an enhanced $H_2$ concentration compared to the initial mixture;
3. feeding the first intermediate mixture into the second catalytic reaction zone $R_2$ through a line connecting the first and second reaction zones;
4. reacting the first intermediate mixture in the second catalytic reaction zone $R_2$ to form a second intermediate mixture or a final production product;
5. optionally repeating the steps 3 and 4 with the second or additional intermediate mixtures in one or more additional reaction zones to obtain a final production product.

33 Claims, 2 Drawing Sheets

US 6,315,977 B1

PROCESS AND APPARATUS FOR PRODUCING HYDROGEN BY THERMOCATALYTIC DECOMPOSITION OF HYDROCARBONS

BACKGROUND OF THE INVENTION (i) Field of the Invention

The present invention relates to the field of the production of hydrogen by the thermocatalytic decomposition (cracking) of hydrocarbons.

(ii) Description of the Related Art

It is known that hydrogen production, in particular on-site, is a major field, especially because of a growing demand in the industrial market for hydrogen, for example for heat-treatment applications.

Many studies have been published in recent years on this subject, particularly studies using catalysts consisting of nickel powder supported on silica ($SiO_2$).

In particular, the following documents may therefore be referred to:

- the article by Zhang et al., published in "Applied Catalysis A," 1998, vol. 167, pp. 161–172;
- the article by Muradov, published in "energy and Fuels," 1998, vol. 12, pp. 41–48;
- the article by Chen et al., published in the journal "carbon," 1997, vol. 35, pp. 1495–1501;
- the article by Poirier et al., published in "International Journal of Hydrogen Energy," 1997, vol. 22. pp. 429–433; or
- the article by Steinberg, published in "International Journal of Hydrogen Energy," 1998, vol. 23, pages 419–425.

The mechanism for hydrogen production under such conditions, which is most commonly accepted in the literature, thus seems to be the adsorption of the hydrocarbon molecule on the surface of a catalyst particle (for example a nickel particle supported on porous silica) followed by the successive dehydrogenation of the hydrocarbon (for example going from $CH_4$ to $CH_3$, then $CH_2$, then CH), in order to end in a carbon atom adsorbed on the surface of the catalyst. This carbon then travels, by thermal diffusion, through the catalyst particle in order to form what are called carbon "nanotubes" or "nanofilaments," a phenomenon allowing the catalyst to be active for a much longer time (the metal surface remains free, accessible and active for a longer time).

It is known that the phenomenon of nanotube formation depends especially on the size of the catalyst particles, on the metal content of the catalyst and on the porosity of the material serving as support for the metal.

This literature can therefore be rapidly summarized by the fact that it has demonstrated the feasibility of the cracking reaction on such catalysts and the activation of the reaction between approximately 550 and 800° C., the fact that maintaining the activity of the catalyst depends essentially on forming these carbon nonofilaments, and that specifically this reaction becomes deactivated when there is so not enough space for these filaments to grow, therefore resulting in the need to regenerate the catalyst, for example by an air flush.

Thus, although all this literature presents the direct catalytic cracking of hydrocarbons as a very promising avenue to explore for the purpose of producing hydrogen (especially on-site), developments undeniably remain to be carried out in order to provide a really industrial process based on this concept, especially when considering the fact that the prior art has obtained all these feasibility results with low gas flow rates and small amounts of catalysts (typically a few milliliters).

Extensive studies by the Applicant have also demonstrated that certain key technical questions still need to be addressed:

- the problem of carbon deposition after cracking: occurring immediately from the start of cracking, and entailing a significant risk of the reactor becoming blocked (only the first portion of the catalyst is then used);
- the difficulties encountered during regeneration of the catalyst: which regeneration is a source of CO and $CO_2$, therefore of soot deposition;
- the regeneration is, moreover, an exothermic process: the increase in temperature and thus the thermocycling resulting therefrom may throw doubt on the integrity of the material;
- short regeneration times have to be obtained, especially when it is hoped to achieve truly industrial conditions.

SUMMARY AND OBJECTS OF THE INVENTION

One of the objectives of the present invention is therefore to propose a response to the technical questions mentioned above.

The process according to the invention, for producing a production gas mixture comprising hydrogen, by thermocatalytic decomposition of an initial mixture which comprises a hydrocarbon or a mixture of hydrocarbons, the decomposition taking place over a catalyst which is capable, on contact with the hydrocarbon, of forming carbon nanotubes, is characterized in that:

- at least one succession, which comprises at least one first and one second catalytic reaction zone, these zones being separate within at least two different consecutive reactors or else being consecutive reactors or else being consecutive within the same reactor, is used;
- the at least one first and one second consecutive catalytic reaction zone are subjected to an increasing temperature gradient and/or have an increasing metal concentration gradient in the catalyst;
- the initial mixture is made to flow into the first catalytic reaction zone so as to form therein a first intermediate mixture which is directed toward the second catalytic reaction zone of the succession, in order to form the required production mixture.

As will have been understood on reading the foregoing, the notion according to the invention of "first zone" and "second zone" of the succession should be understood by considering the direction of flow of gas to be cracked in the succession.

The process according to the invention may also adopt one or more of the following technical characteristics:

- the succession comprises at least two catalytic reaction zones, each zone being located in a separate reactor;
- the succession comprises at least two catalytic reaction zones positioned consecutively in the same reactor;
- after a phase in which the production mixture is produced, the process continues with a phase in which the catalytic reaction zones of the succession are regenerated in the following manner: each of the catalytic reaction zones of the succession are independently and simultaneously flushed with the aid of a regeneration gas (for example an oxidizing gas);

after a phase in which the production mixture is produced, the process continues with a phase in which the catalytic reaction zones of the succession are regenerated in the following manner: each of the catalytic reaction zones of the succession are independently and simultaneously flushed with the aid of an oxidizing regeneration gas, the regeneration gas used differing from one zone to another by the fact that it has a different residual oxygen concentration;

after a phase in which the production mixture is produced, the process continues with a regeneration of the catalytic reaction zones of the succession by independently and simultaneously flushing each of the catalytic reaction zones with the aid of a regeneration gas, each of the reaction zones following the first zone of the succession being regenerated in the following manner: a pipe for feeding a regeneration gas is used for each of the catalytic reaction zones which follow the first zone of the succession, each feed pipe being connected to the line used for directing, toward the zone to be regenerated in question, the intermediate mixture produced by the zone preceding it in the succession (the "first zone" and "the following zones" of the succession will be defined by considering the direction of flow of the gas to be cracked in the succession—the regeneration configuration thus described therefore corresponds to concurrent regeneration with respect to the direction of flow of the gas to be cracked in the succession);

after a phase in which the production mixture is produced, the process continues with a regeneration of the catalytic reaction zones of the succession by independently and simultaneously flushing each of the catalytic reaction zones with the aid of a regeneration gas, each of the reaction zones which precede the last zone of the succession being regenerated in the following manner, a pipe for feeding a regeneration gas is used for each of the catalytic reaction zones which precede the last zone of the succession, each of the feed pipes being connected to the line used for extracting, from the zone to be regenerated in question, the intermediate mixture produced by the zone in question (and for directing the intermediate mixture toward the next zone in the succession) (the "last zone" and "the preceding zones" of the succession will be defined by considering the direction of flow of the gas to be cracked in the succession—the regeneration configuration thus described therefore corresponds to a countercurrent regeneration with respect to the direction of flow of the gas to be cracked in the succession);

the phase of regenerating each reaction zone is carried out in the following manner: the flow rate of regeneration gas flushing a given catalytic reaction zone is less than the flow rate of regeneration gas flushing the zone which precedes this given zone in the succession;

the phase of regenerating each reaction zone is carried out in two successive steps of flushing each of thee reaction zones with the aid of the regeneration gas, the regeneration-gas flow rate in the second step being greater than the gas flow rate used for the first step;

before the phase of regenerating each reaction zone, each zone of the succession is purged with the aid of an inert gas;

after the phase of regenerating each reaction zone and before a production phase is started, each zone of the succession is purged with the aid of an inert gas and then each sone of the succession is flushed with the aid of a hydrogen gas;

the regeneration gas coming from one of the zones of the succession is quenched before it flows into the next zone;

the regeneration gas is an oxidizing gas chosen from air, oxygen, $CO_2$, water vapor and mixtures of these gases;

each of the catalytic reaction zones of the succession is maintained at a temperature lying within the range going from 500 to 1000° C.;

each of the catalytic reaction zones of the succession uses a catalyst based on nickel, cobalt, chromium, iron, platinum, palladium or rhodium;

each of the catalytic reaction zones of the succession uses a catalyst based on supported nickel;

the production gas mixture thus obtained as output from the succession of catalytic reaction zones undergoes one or more purification post-treatments for the purpose of increasing the hydrogen concentration in the mixture, for example by employing a preferential adsorption technique;

at least two successions of catalytic reactions are used, one of the successions being used in production phase while another succession is in regeneration phase, and so on.

Further characteristics and advantages of the invention will emerge from the following description, given solely by way of example, and with reference to the appended drawings.

DETAILED DESCRIPTION OF PREFERRED EMBODIMENTS

Figure 1:
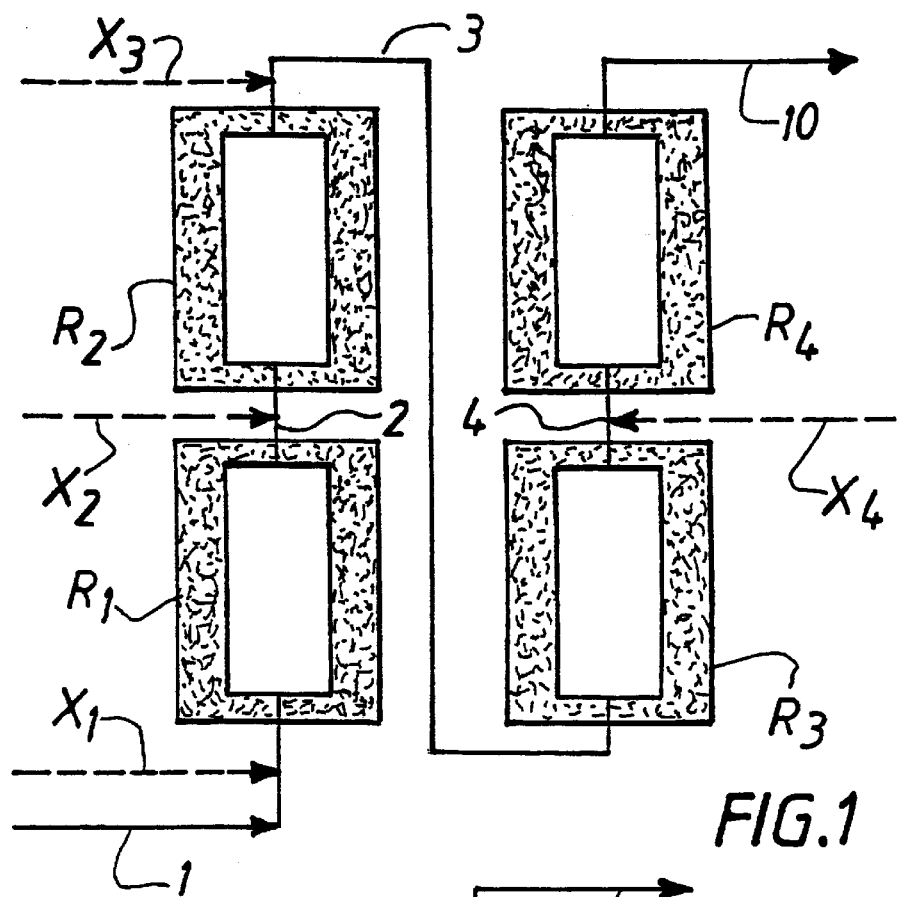
FIG. 1 is a partial schematic representation of a plant suitable for implementing the process according to the invention.

FIG. 1 shows a succession of four consecutive catalytic reaction zones $R_1$, $R_2$, $R_3$, and $R_4$ located within four different catalytic reactors.

Shown symbolically by the reference 1 is the influx of an initial gas mixture which comprises the hydrocarbon (for example, natural gas) at the bottom of the reactor $R_1$.

As shown very clearly in FIG. 1, the first intermediate gas mixture resulting from the catalytic cracking of the initial mixture in the reactor $R_1$ is transferred (line 2) into the bottom of the reactor $R_2$, where it undergoes catalytic cracking, the resulting intermediate mixture then being transferred (line 3) to the bottom of the reactor $R_3$ and so on.

The final gas mixture coming from the reactor $R_4$, that is to say the required production gas mixture which comprises hydrogen, is then withdrawn from the plant via the line 10 and, for example, directed toward the user point, or else toward one or more purification post-treatment points for the purpose of increasing the hydrogen concentration in the mixture, for example by employing a preferential adsorption technique. It will therefore be advantageous here to recycle the desorption mixture, rich in hydrogen and in hydrocarbon, into the inlet for the process (initial mixture).

Depending in particular on the nature of the subsequent uses of the production mixture and depending on whether or not post-treatment steps for purifying the mixture are carried out, the initial mixture may be made to flow into the first zone of the succession at a pressure close to atmospheric pressure or, on the contrary, it may be chosen to flow thereinto under pressure, typically with an initial pressure of 5 to 15 or even 20 bars (which may, for example, make it easier to carry out a subsequent purification step by preferential adsorption, which typically requires pressure).

The production gas mixture therefore typically comprises hydrogen, an uncracked residue of hydrocarbon(s) and usually nitrogen, nitrogen being constantly present in the sources of hydrocarbon available.

The references $X_1$ to $X_4$ depict the inflows of regeneration gas (here an oxidizing gas) into the plant, allowing each of the catalytic reaction zones of the plant to be regenerated in parallel, simultaneously and independently: in this case, the regeneration-gas feed pipe $X_1$ (for regenerating $R_1$) being connected to the bottom of the reactor $R_1$, the oxidizing regeneration-gas feed pipe $X_2$ (for the reactor $R_2$) being connected to the pipe 2 for transferring the first intermediate mixture from the reactor $R_1$ to the reactor $R_2$, and so on.

As will be clearly apparent to those skilled in the art upon examining this figure, such inflows $X_i$ of regeneration gas into the bottom of the first reactor of the succession, and between two reaction zones with regard to the following reactors, make it possible, on the one hand, to regenerate the reactor following the point of connection of a given feed pipe, but also to flush the lines, preventing any soot being deposited.

As will also have been understood on reading the foregoing, the feed pipes $X_i$ serve not only to supply the oxidizing regeneration gas but also may serve, if required, depending on the chosen mode of implementing the invention, to supply an inert purge gas prior to the regeneration phase or to supply an inert purge gas and a hydrogen flushing gas after the regeneration phase.

Although FIG. 1 illustrates one mode of implementing the invention, in which the regeneration is carried out as a cocurrently with respect to the direction of flow of the gas to be cracked in the succession, it is conceivable, as already mentioned earlier, and without departing from the scope of the present invention, for there to be a countercurrent regeneration with respect to the direction of flow of the gas to be cracked in the succession, by slightly modifying the plant shown in FIG. 1:

elimination of the inflow $X_1$ ;

the inflow $X_2$ serves to regenerate $R_1$, the inflow $X_3$ serves to regenerate $R_2$ and the inflow $X_4$ serves to regenerate $R_3$;

an inflow $X_5$ of the gas for regenerating the reactor $R_4$ then has to be provided, this being connected downstream of this reactor near the line 10.

According to the invention, the four reaction zones in FIG. 1 are subjected to an increasing temperature gradient (that is to say conditions under which the temperature of $R_1$ is less than the temperature of $R_2$, which in turn is less than the temperature of $R_3$, etc.) and/or have an increasing metal concentration gradient in the catalyst (metal concentration in $R_1$ less than the metal concentration in $R_2$, which in turn is less than the metal concentration in $R_3$, etc.).

By way of illustration, the plant in FIG. 1 may be used under the following conditions, each catalytic reaction zone employing a nickel catalyst on silica (specific surface area of about 500 m$^2$/g, particle size of less than 800 μm and typically between 100 and 600 μm, porosity of the order of 50 to 100 Å):

reactor $R_1$: maintained at a temperature of 600° C. to 700° C., the nickel concentration of the catalyst being about 10%;

reactor $R_2$: maintained at a temperature of 700° C. to 800° C., the nickel concentration of the catalyst being about 15%;

reactor $R_3$: maintained at a temperature of 800° C. to 875° C., the nickel concentration of the catalyst being about 20%;

reactor $R_4$: maintained at a temperature of 875° C. to 950° C., the nickel concentration of the catalyst being about 25%;

Such catalyst characteristics (size, porosity, etc.) favor the production of a fluidized bed (catalyst suspended in the gas, uniformity of distribution in space, better temperature uniformity in the reactor).

By way of illustration, the use of such a plant for cracking methane gives the following compositions of output mixtures from each reactor.

output from the first reactor $R_1$: about 51% $H_2$ and 49% $CH_4$;

output from the second reactor $R_2$; about 76% $H_2$ and 24% $CH_4$;

output from the third reactor $R_3$; about 89% $H_2$ and 11% $CH_4$;

output from the fourth reactor $R_4$, about 98% $H_2$ and 2% $CH_4$.

Figure 2:
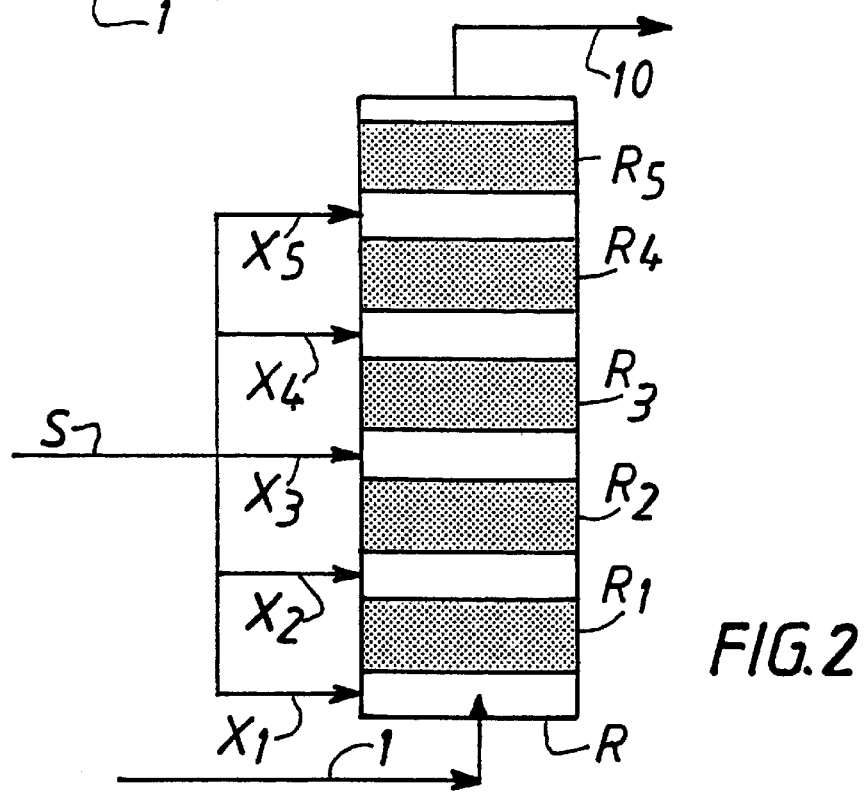
FIG. 2 is a partial schematic representation of another plant suitable for implementing the process according to the invention.

FIG. 2 shows another mode of implementing the invention in which five catalytic reaction zones $R_1$ to $R_5$ are joined together consecutively within the same reactor.

Here again, the reference 1 denotes the inflow of the initial gas mixture to be cracked in the bottom of the reactor, that is to say in the bottom of the reaction zone $R_1$, while the reference 10 represents the withdrawal of the final production gas mixture obtained in the top of the reactor, that is to say in the top of the last reaction zone $R_5$ of the succession.

Once again, starting here with the same regeneration source S (but, as already pointed out, a multiplicity of regeneration gas sources could also be used instead of this single source S), means ($X_1$ to $X_5$) are used which allow each of the catalytic reaction zones of the succession to be independently and simultaneously in flushed and regenerated.

Figure 3:
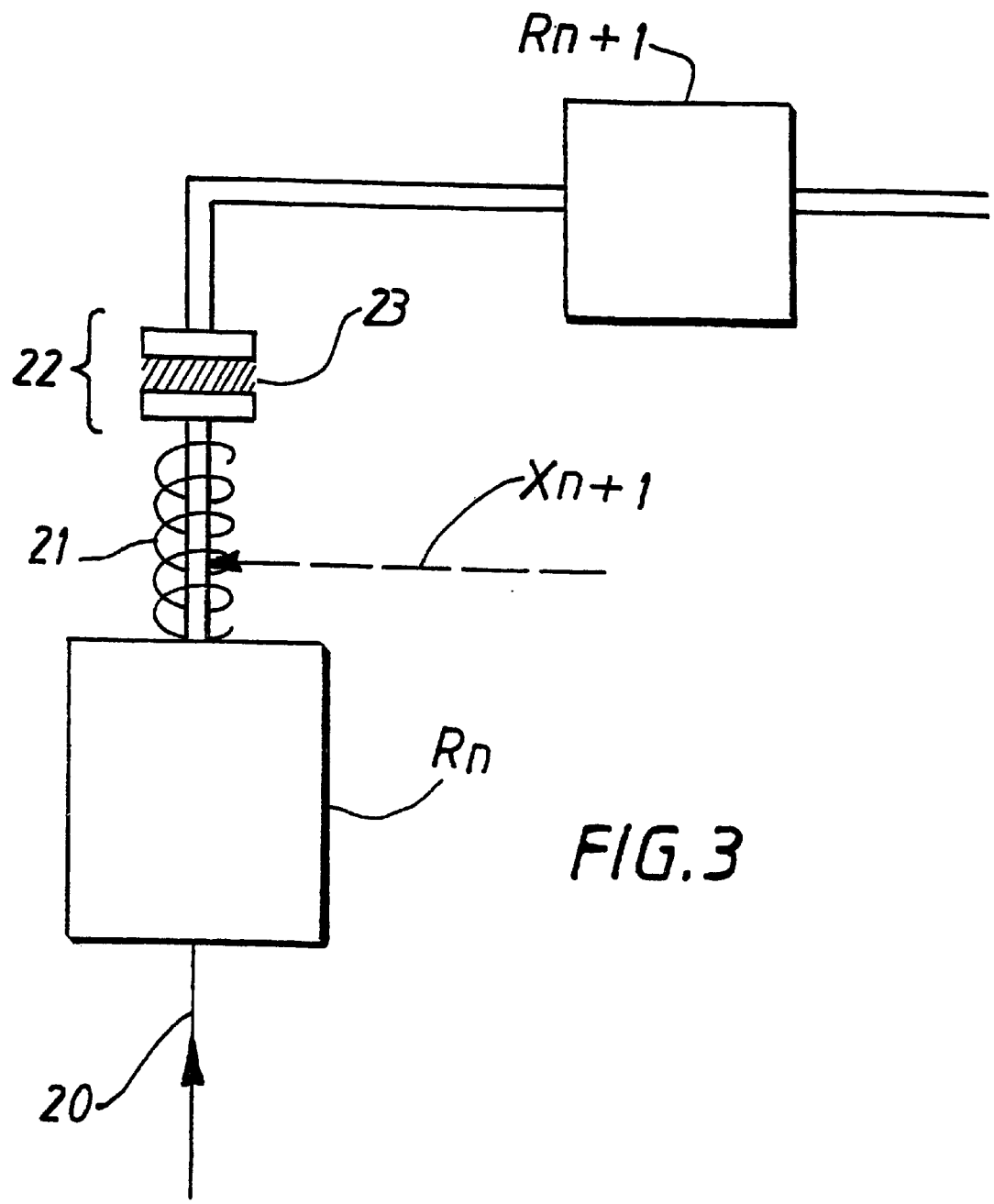
FIG. 3 is a detailed partial schematic view of one of the reaction zones of FIG. 1, in particular of its line for discharging the intermediate cracking mixture which is produced therein and of a regeneration-gas feed pipe which is connected to this line according to the invention.

As regards FIG. 3, this shows a detailed view of the intermediate part between two successive reactors in FIG. 1 (typically between the reactors $R_1$ and $R_2$ or else between the reactors $R_3$ and $R_4$).

This therefore shows, between the reactor $R_n$ and the reactor $R_{n+1}$, a line allowing the intermediate gas mixture resulting from the cracking carried out in the reactor $R_n$ to be transferred to the reactor $R_{n+1}$, to which line a feed pipe $X_{n+1}$, for a gas mixture for regenerating the reactor $R_{n+1}$ is connected.

This detailed view makes it possible to show an advantageous method of implementing the invention in which a system 21 (here, a coil through which water, for example, flows) for quenching the regeneration gas mixture coming from the reactor $R_n$ is used over part of the line in question, which quenching is carried out not only to reduce the temperature of the regeneration gas coming from the reactor in question (let us recall that the regeneration is very exothermic) but also to freeze the composition of this mixture (which includes CO and $CO_2$) and prevent the formation of any particle (especially soot). Moreover, the regeneration-gas feed pipe $X_{n+1}$ is connected to this quenched portion of the line.

This mode of implementation also includes a fixture 22 provided with a means 23 for retaining the catalyst powders which possibly might have been entrained upward by gas coming from the reactor $R_i$. The means 23 may consist of a filter, a porous substance, a frit, etc.

As already mentioned, although FIG. 1 illustrates a cocurrent regeneration configuration with respect to the direction of flow of the gas to be cracked in the succession, a countercurrent regeneration configuration is also conceivable (the inflow $X_4$ serving to regenerate the reactor $R_3$, etc.). Just as before, in such a case of countercurrent regeneration, it will also be advantageous to use a system for quenching the regeneration gas mixture coming from a given reactor $R_n$, similar to the system described in the context of FIG. 3.

Examining the modes of implementation illustrated in FIGS. 1 and 2, it is apparent that, especially for practical maintenance and material-changing reasons, a mode of implementation such as that illustrated in the context of FIG. 1, in which all the reaction zones are placed in separate and consecutive reactors, is preferred over a mode of implementation in which all the reaction zones are all combined within the same reactor, as is the case of the mode illustrated in the context of FIG. 2.

Returning to the mode of implementation illustrated in the context of FIG. 1, with its temperature gradient and/or metal concentration gradient in the catalyst, the following characteristics and advantages may also be mentioned:

a) the use of such a succession of reactors decreases the amount of carbon deposited from one zone to another in the succession: more carbon deposited in the zone $R_1$ and less carbon deposited in the last zone $R_4$.

It is known in fact that the degree of conversion of the reaction depends not only on the temperature but also on the concentration of hydrocarbon present in the incoming mixture. Here, because of the succession adopted and therefore of the successive cracking, this hydrocarbon concentration decreases from one zone to another.

However, the application according to the invention of an increasing temperature gradient in the succession and/or of an increasing metal concentration gradient in the catalyst makes it possible for the amount of carbon deposited in each zone to be precisely controlled;

b) the independent and simultaneous regeneration of each of the zones makes it possible to obtain a shorter regeneration time compared with the case of a single-reactor structure in which the carbon is deposited immediately at the start of the zone, entailing a significant risk of blockage, and therefore a long subsequent regeneration procedure;

c) it is known that the regeneration of these reaction zones with the aid of an oxidizing gas, such as air, proves to be an exothermic reaction and that the resulting temperature increase (and thus the thermal cycling) may throw into question the integrity of the materials. In practice, it is preferable to remain, during regeneration, at a temperature not exceeding 1000° C. in each zone.

According to the mode of implementing the invention involving a temperature gradient, the maximum amount of carbon is deposited in a zone at lower catalyst temperature while the minimum amount of carbon is deposited in the last zone of the succession which is maintained at the highest temperature. It is therefore found that, according to the invention, the regeneration will proceed better and more reliably at a temperature not exceeding 1000° C. in any of the zones of the succession;

d) as described earlier in the present application, it is then most particularly advantageous at each zone to adapt the necessary regeneration-gas flow rate, in this case by the fact that decreasing amounts of carbon from one zone to another of the succession are obtained, it will be advantageous to use a regeneration-gas flow rate which decreases from the first zone $R_1$ of the succession to the last zone $R_4$ of the succession;

e) it should be noted that, according to one of the advantageous modes of implementing the invention, the phase of regenerating each reaction zone is carried out in two successive flushing steps, the regeneration-gas flow rate of the second step being greater than the regeneration-gas flow rate employed for the first step. The first flushing step at a lower flow rate is most particularly advantageous so as to firstly reduce the temperature of the catalyst;

f) likewise, it is advantageous, as mentioned, to purge each zone of the succession with the aid of an inert gas before the phase of regenerating each reaction zone. Such a purge makes it possible, on the one hand, to precool the zone and, on the other hand, to remove any residual traces of hydrogen and therefore prevent the formation of water vapor during the subsequent regeneration;

g) according to one of the aspects of the invention, after a phase of regenerating each reaction zone and before a production phase is restarted, it is possible to purge each zone of the succession with the aid of an inert gas and then flush each zone of the succession with the aid of a hydrogen gas. This is because the inert purge allows possible traces of oxygen, water vapor or carbon oxides to be removed before the hydrogen flushing that follows, the purpose of which is, depending on the specifications required by user site for the production mixture, to limit the presence of nitrogen in this mixture.

What is claimed is:

1. A process for producing a production gas mixture comprising hydrogen, by thermocatalytic decomposition of an initial mixture which comprises at least one hydrocarbon, comprising the steps of:

(i) feeding said initial mixture to a system comprising, in succession, at least a first reaction zone $R_1$ and a second reaction zone $R_2$, each of said reaction zones including a catalyst, comprising a concentration of a metal, which is capable on contact with the hydrocarbon of forming carbon nanotubes, wherein said zones $R_1$ and $R_2$:
are separate within at least two different consecutive reactors or consecutive within the same reactor, and
are subjected to at least one of an increasing temperature gradient and an increasing metal concentration gradient in the catalyst;

(ii) reacting said initial mixture in said first catalytic reaction zone $R_1$ to form a first intermediate mixture comprising an enhanced $H_2$ concentration compared to said initial mixture;

(iii) feeding said first intermediate mixture into said second catalytic reaction zone $R_2$ through a line connecting said first and second reaction zones;

(iv) reacting said first intermediate mixture in said second catalytic reaction zone $R_2$ to form a second intermediate mixture or a final production product;

(v) optionally repeating said steps (iii) and (iv) with said second or additional intermediate mixtures in one or more additional reaction zones to obtain a final production product.

2. The process according to claim 1, wherein said at least two catalytic reaction zones in succession are each located in a separate reactor.

3. The process according to claim 1, wherein said at least two catalytic reaction zones in succession are positioned consecutively in the same reactor.

4. The process according to claim 1, further comprising the step of regenerating the catalytic reaction zones of the system, after a phase in which said production mixture is produced, by independently and simultaneously flushing each of the catalytic reaction zones with a regeneration gas.

5. The process according to claim 1, further comprising the step of independently and simultaneously regenerating each of the catalytic reaction zones, after a phase in which said production mixture is produced, by flushing each of the catalytic reaction zones with an oxidizing regeneration gas, the regeneration gas used differing from one zone to another by the fact that it comprises a different residual oxygen concentration.

6. The process according to claim 2, further comprising the step of independently and simultaneously regenerating each of the catalytic reaction zones, after a phase in which said production mixture is produced, by flushing each of the catalytic reaction zones with a regeneration gas, wherein said flushing of said catalytic reaction zones following said first zone comprises feeding a regeneration gas through a pipe connected to the line for feeding said intermediate mixture, produced by the zone preceding it, to each of the reaction zones following the first zone.

7. The process according to claim 2, further comprising, after a phase in which said production mixture is produced, the step of regenerating the catalytic reaction zones by independently and simultaneously flushing each of the catalytic reaction zones with a regeneration gas, each of the reaction zones which precede the last zone being regenerated by feeding a regeneration gas through a pipe connected to the line used for extracting, from the zone to be regenerated in question, the intermediate mixture produced by this zone in question.

8. The process according to claim 4, comprising flushing each of said catalytic reaction zones with a flow of regeneration gas which is at a rate less than that of the regeneration gas flushing the zone which precedes this given zone.

9. The process according to claim 4, comprising flushing each of said catalytic reaction zones in two successive steps with a flow of said regenerating gas at a rate which is greater in said second step than the gas flow rate used for the first step.

10. The process according to claim 4, further comprising the step of purging each catalytic reaction zone with an inert gas before said step of regenerating the catalytic reaction zones.

11. The process according to claim 4, further comprising, after said phase of regenerating said catalytic reaction zones, the step of purging each zone with an inert gas and then flushing each zone with hydrogen gas.

12. The process according to claim 4, further comprising the step of quenching the regeneration gas coming from each of said catalytic zones before it flows into the next zone.

13. The process according to claim 4, wherein said regeneration gas is an oxidizing gas comprising air, oxygen, $CO_2$, water vapor or mixtures thereof.

14. The process according to claim 1, further comprising maintaining each of said catalytic zones at a temperature lying within the range going from 500 to 1000° C.

15. The process according to claim 1, wherein the catalyst in said catalytic reaction zones comprises nickel, cobalt, chromium, iron, platinum, palladium or rhodium.

16. The process according to claim 15, wherein said catalyst comprises supported nickel.

17. The process according to claim 1, further comprising carrying out one or more post-treatment purification steps of the production gas mixture obtained as output from the catalytic reaction zones in order to increase the hydrogen concentration in the mixture.

18. The process according to claim 1, comprising employing two of said systems comprising, in succession, at least two reaction zones, one of said systems being used in production phase while another system is subjected to a regeneration phase.

19. The process according to claim 1, comprising feeding said initial mixture into said first catalytic reaction zone at a pressure of between 5 and 20 bars.

20. A plant for producing a production gas mixture comprising hydrogen, by thermocatalytic decomposition of an initial mixture which comprises at least one hydrocarbon, the catalyst used being capable, on contact with the hydrocarbon, of forming carbon nanotubes, comprising:

at least one system comprising, in succession, at least one first and one second catalytic reaction zone ($R_1$, $R_2$ etc.), said zones being separate within at least two different consecutive reactors or consecutive within the same reactor (R), said catalytic reaction zones each comprising a catalyst which itself comprises a concentration of metal;

feed lines which allow said initial mixture to be treated to flow into said first catalytic reaction zone so as to form a first intermediate mixture and which allow the first intermediate mixture thus formed to be directed to said second or additional catalytic reaction zones of the system in order to form said required production gas mixture therein;

wherein each of said catalytic reaction zones differs from a preceding catalytic reaction zone at least in that (a) the catalyst has an increasing metal concentration gradient as compared to the catalyst in the preceding zone; and (b) the catalytic reaction zones are subjected to an increasing temperature gradient as compared to the preceding zone.

21. The plant according to claim 20, wherein said system comprises at least two catalytic reaction zones, each zone being located in a separate reactor.

22. The plant according to claim 20, wherein said system comprises at least two catalytic reaction zones positioned consecutively in the same reactor (R).

23. The plant according to claim 21, further comprising a source of a regenerating gas making it possible to carry out, after a phase in which said production mixture is produced, a phase in which the catalytic reaction zones of the system are regenerated by independently and simultaneously flushing each of the catalytic reaction zones of the system with the aid of the regeneration gas.

24. The plant according to claim 21, further comprising a source of an oxidizing regeneration gas for regenerating the catalytic reaction zones of the system, after a phase in which said production mixture is produced, said source permitting independent and simultaneous delivery to each of said catalytic reaction zones of a regeneration gas which differs from one zone to another in its residual oxygen concentration.

25. The plant according to claim 21, further comprising:
a source of a regenerating gas for regenerating the catalytic reaction zones, after a phase in which said production mixture is produced, said source permitting independent and simultaneous flushing of each of the catalytic reaction zones of the system with said regeneration gas;

a regeneration gas feed pipe, for each of said catalytic reaction zones following the first zone of the system, each feed pipe being connected to the line used for directing, toward the reaction zone in question, the intermediate mixture produced by the zone preceding it in the system.

26. The plant according to claim 21, further comprising:

a source of a regeneration gas for regenerating the catalytic reaction zones of the system, after a phase in which said production mixture is produced, said source permitting independent and simultaneous flushing of each of the catalytic reaction zones of the system with said regeneration gas;

a regeneration gas feed pipe, for each of said catalytic reaction zones which precede the last zone of the system, each of the feed pipes being connected to the line used for extracting, from the zone to be regenerated in question, the intermediate mixture produced by this zone in question.

27. The plant according to claim 23, wherein said regeneration gas is a source of an oxidizing gas comprising air, oxygen, $CO_2$, water vapor or mixtures thereof.

28. The plant according to claim 23, further comprising a regeneration gas quencher between catalytic reaction zones for regenerating gas coming from one of the zones of the system before it flows into the next zone.

29. The plant according to claim 20, wherein the catalyst in the catalytic reaction zones comprises nickel, cobalt, chromium, iron, platinum, palladium or rhodium.

30. The plant according to claim 29, wherein the catalyst in the catalytic reaction zones comprises supported nickel.

31. The plant according to claim 20, further comprising one or more purifiers for the production gas mixture obtained as output from the system of catalytic reaction zones.

32. The plant according to claim 20, comprising at least two catalytic reaction zones systems.

33. A process for producing a production gas mixture comprising hydrogen, by thermocatalytic decomposition of an initial mixture which comprises at least one hydrocarbon, comprising feeding said initial mixture, in series, to at least two reaction zones, each of said reaction zones including a catalyst comprising a metal which is capable on contact with the hydrocarbon of forming carbon nanotubes, wherein said at least two reaction zones are subjected to at least one of (i) an increasing temperature gradient and (ii) an increasing metal concentration gradient; and thermocatalytically decomposing said initial mixture, in series, through each reaction zone to obtain an intermediate or product gas of increasingly higher $H_2$ concentration.

* * * * *